United States Patent [19]

Biggs, Jr. et al.

[11]  4,080,787

[45]  Mar. 28, 1978

[54] HIGH VELOCITY SPIRAL AIR MOTOR

[76] Inventors: Howard Biggs, Jr., 1014
Nesquehoning St., Easton, Pa. 18042;
Vincent Raymond Meiley, 2421
Miller Ave., Whitenall, Pa. 18052

[21] Appl. No.: 748,346

[22] Filed: Dec. 7, 1976

[51] Int. Cl.² ............................................ F15B 13/07
[52] U.S. Cl. ........................................ 60/407; 415/52;
415/122 R; 415/202; 60/689
[58] Field of Search ................ 415/52, 92, 75, 122 R,
415/202; 60/407, 412, 650, 654, 689, 682

[56] References Cited

U.S. PATENT DOCUMENTS

| 300,506 | 6/1884 | Renshaw | 60/654 |
|---|---|---|---|
| 722,083 | 3/1903 | Burke | 415/52 |
| 748,759 | 1/1904 | Leavitt | 60/407 |
| 1,874,294 | 8/1932 | Horton et al. | 60/407 |
| 2,655,001 | 10/1953 | Napoli | 415/122 R |
| 4,025,224 | 5/1977 | Starbard | 415/122 R |

Primary Examiner—C. J. Husar
Attorney, Agent, or Firm—Sughrue, Rothwell, Mion, Zinn and Macpeak

[57] ABSTRACT

A pair of sealed, concentric metal tanks define a high pressure air storage chamber between the tanks, while the inner of the two tanks forms an air expansion chamber and carries a plurality of axially spaced impellers fixed to a shaft mounted for rotation coaxially through both concentric tanks. A plurality of tubular inductor nozzles are fixedly mounted to the motor and project at circumferentially and axially spaced positions into the inner chamber and carry high pressure expansion nozzles which receive air from the high pressure storage chamber and induce recirculated, low pressure air from the inner chamber to flow through the tubular inductor nozzles for impingement on the respective impellers. Planetary gearing couples the impellers to the shaft to effect high velocity rotation of the output shaft of the motor.

8 Claims, 4 Drawing Figures

HIGH VELOCITY SPIRAL AIR MOTOR

BACKGROUND OF THE INVENTION

1. Field of the Invention

This invention relates to air motors, and more particularly, to an air motor which operates for extended periods of time by means of a high pressure compressed air supply and by recirculating the air, whose pressure initially drops during impingement against the impeller of the multi-impeller shaft assembly.

2. Description of the Prior Art

Attempts have been made to employ air available at relatively high velocity and/or pressure as a means for inducing rotation of a multi-vane impeller or the like fixed to a shaft by means of an air nozzle which discharges the compressed air at a relatively high velocity against the impeller blade to rotate the impeller and the shaft upon which the impeller is mounted. The problem with known machines of this type is that once the air impacts the impeller blading, that air is normally discharged to the atmosphere or otherwise wasted.

It is therefore an object of this invention to provide an improved high velocity spiral air motor in which air at relatively high pressure is injected through one or more air nozzles against the impeller blades of an associated impeller for driving the impeller and its support shaft at a relatively high velocity, and wherein that air after impingement is re-introduced to the air mozzle and re-used to impart additional rotative force to the impeller in successive cycles.

It is a further object of this invention to provide a high velocity spiral air motor of this type which employs concentric sealed cylindrical casings to define an outer, high pressure air storage chamber and an internal chamber within which the impellers are mounted with the output shaft extending coaxially and rotatably mounted by the concentric closed cylindrical casings.

It is a further object of the invention to provide an improved high velocity, spiral air motor which employs a plurality of inductor tubes as the air nozzles for the spiral air motor, wherein the expansion of air from the high pressure air storage chamber through a nozzle at high velocity induces the flow of low pressure air from the inner cylindrical casing which acts as a low pressure air accumulator chamber for common impingement of air from both sources against the impeller blades to effect by recirculation of air the improved efficiency and extended operation of the air motor.

SUMMARY OF THE INVENTION

The present invention preferably comprises concentric inner and outer closed cylindrical casings defining a high pressure air storage chamber between the inner casing and the outer casing and a low pressure air accumulator chamber within the inner casing. A shaft projecting at least through the inner casing and extending coaxially thereof supports a plurality of radial impellers which are operatively connected to the shaft at axially spaced positions within the inner casing, each of which includes a plurality of circumferentially spaced radial impeller blades. A plurality of tubular air inductor nozzles are fixedly mounted to the motor and projecting generally radially into the inner chamber with their discharge ends located tangential to the periphery of respective impellers. A high pressure manifold leads from the first, high pressure air storage chamber to the inlet ends of said nozzles. A low pressure manifold leads from one end of the inner chamber to respective inductor openings within the tubular air inductor nozzles, radially inwards of the high pressure manifold openings. Means define a converging nozzle passage intermediate of the low pressure and high pressure manifold openings within the tubular inductor nozzles, whereby high pressure air from the high pressure air storage chamber in discharging at very high velocity through the converging nozzle passages within the tubular inductor nozzles aspirates the low pressure air through the low pressure manifold openings within the tubular inductor nozzles for common discharge from both sources against the impeller blades to commonly drive the impellers, thereby effecting re-circulation and re-use of the air initially stored in the high pressure storage chamber for extended operation and improved efficiency of the spiral air motor.

Preferably, the output shaft extends axially through both cylindrical casings and bearing means at opposed ends of the outer casing rotatably support the shaft for rotation about its axis. The tubular inductor nozzles are preferably equally, circumferentially spaced about the shaft axis to equalize the loading of the shaft bearing during operation of the motor.

The tubular inductor nozzles preferably comprise elongated hollow tubes having oblique open radially inner ends to facilitate tangential discharge of air against the periphery of the impellers. The means defining a converging nozzle passage within each tubular inductor nozzle comprises a sleeve member having an outer diameter on the order of the inner diameter of the tubular inductor nozzle and being slidably positioned within the tubular inductor nozzle. The sleeve member comprises a converging internal passage in the direction of air flow and has means for axially adjusting the position of the sleeve within the tubular inductor nozzle such that the end of the sleeve variably closes off the high pressure manifold opening to the tubular inductor nozzle. An end cap closes off the outboard end of the tubular inductor nozzle and threadably supports a shaft which is fixed on its inner end by an open cage to the sleeve member such that rotation of the shaft causes axial shifting of the sleeve relative to the high pressure manifold opening.

Preferably, planetary gear trains are employed between respective impellers and the common output shaft to effect a large speed differential between the air driven impeller and that of the output shaft. A valved connection is made between the low pressure manifold and the high pressure air storage chamber such that communication may be selectively effected between the low pressure manifold and the high pressure air storage chamber upon reduction of air pressure within the high pressure air storage chamber, subsequent to initial operation of the spiral air motor.

DESCRIPTION OF THE PREFERRED EMBODIMENT

Figure 1:
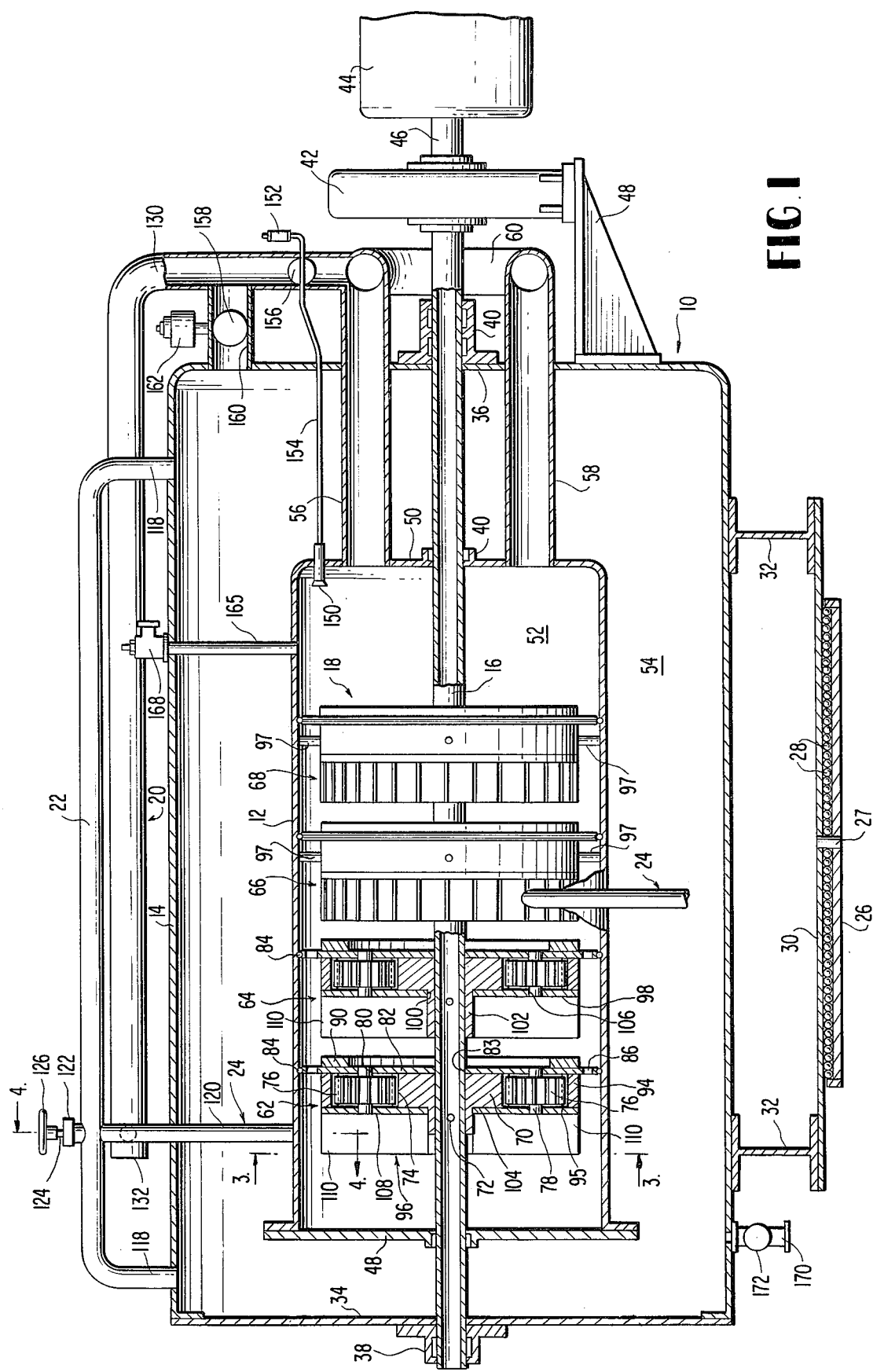
FIG. 1 is a sectional elevational view of one embodiment of the improved high velocity spiral air motor of the present invention.
Figure 2:
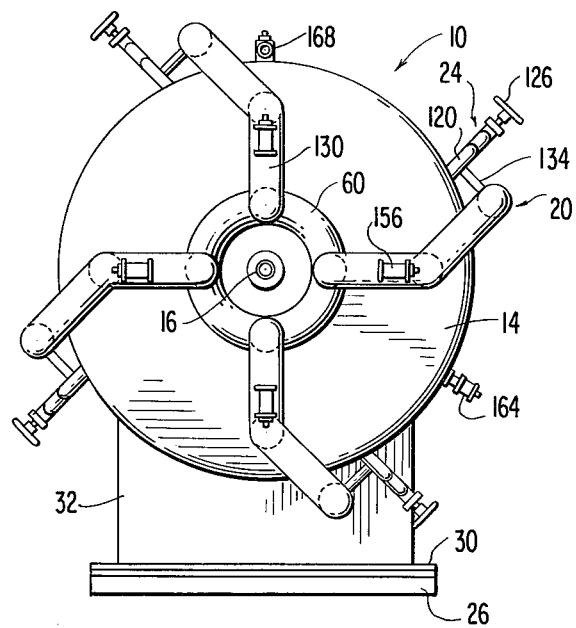
FIG. 2 is an end view of the motor of FIG. 1.

Referring to the drawings, the improved high velocity spiral air motor of the present invention is seen in one form and indicated generally at 10. The principal components of the air motor 10 of the present invention comprise inner and outer concentric sealed cylindrical casings or housings 12 and 14, respectively, a motor output or drive shaft 16, multiple impeller assemblies 18 for shaft 16, low pressure manifolds 20, high pressure manifolds 22 and a plurality of tubular inductor nozzles indicated generally at 24.

As may be seen in FIG. 1, the spiral air motor 10 of the present invention has its axis extending generally horizontal and is mounted for rotation about a vertical axis on a fixed base plate 26 by way of pin 27, ball bearings 28, the bearings being interposed between the base plate 26 and a turntable 30. Mounted to the turntable are axially spaced I-beams 32 upon which is fixedly mounted the outer cylindrical casing 14. These parts may comprise metal and may be welded to each other.

The outer casing 14 is formed with end wall 34 at the left and end wall 36 at the right. End wall 34 supports a sleeve bearing assembly 38 for rotatably and sealably supporting one end of the output shaft 16 of the motor, the right end wall 36 of the outer casing 14 fixedly supporting a second sleeve bearing assembly 40 through which the output shaft 16 projects. This shaft is coupled directly to a torque converter 42 and in turn to a speed transmission assembly 44 by way of shaft 46. The torque converter is fixedly mounted to the outer casing 14 by way of a bracket member 48.

In turn, the inner cylindrical casing 12 is provided with axially spaced end walls 48 and 50 with the shaft 16 projecting therethrough and being sealed to the end walls 48 and 50 such that the inner cylindrical casing 12 defines an inner low pressure air accumulator chamber 52 within which resides the multiple impeller assembly 18, while the space between the inner cylindrical casing 12 and outer cylindrical casing 14 defines a high pressure air storage chamber 54. The inner casing 12 is fixedly mounted to the outer casing by way of a pair of longitudinally extending tubes 56 and 58 which open into chamber 52 and extend completely through the chamber 54 projecting axially beyond the end wall 36 of casing 12. Further, the tubes 56 and 58 feed to the low pressure manifolds indicated generally at 20 and are in fluid communication therewith through an annular tube 60 which concentrically surrounds the output shaft 16 to the right of the bearing assembly 40. The inner casing 12 may be also fixed at other points to the outer casing 14.

Figure 3:
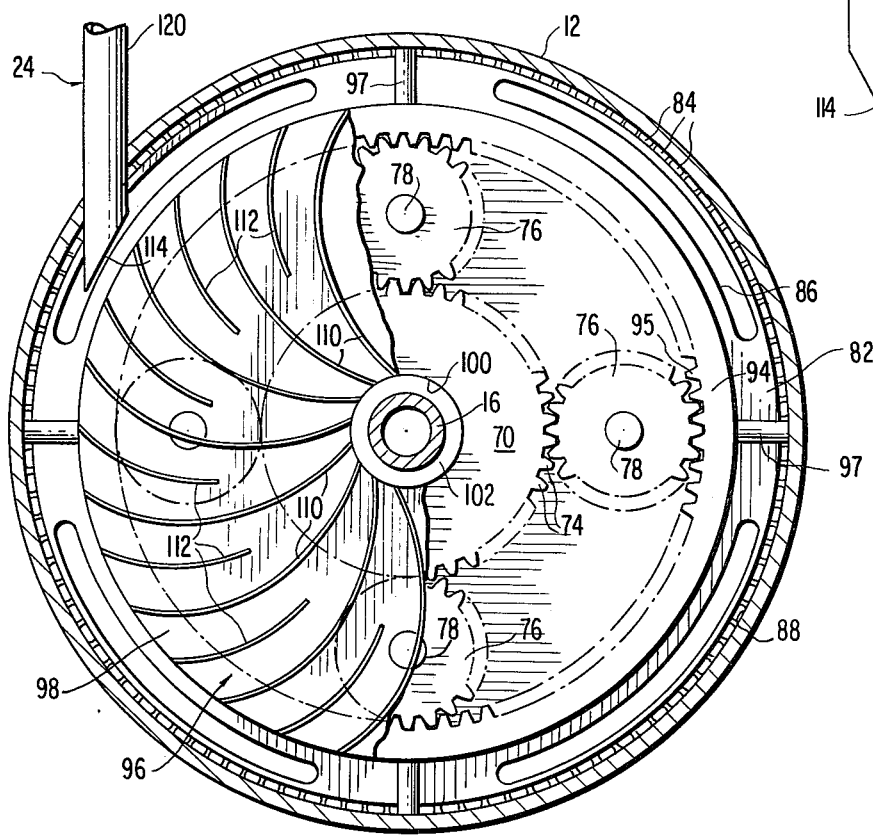
FIG. 3 is a sectional elevation of a portion of the motor of FIG. 1 taken about lines 3—3.

In the illustrated embodiment, the output shaft 16 with the multiple impeller assembly 18 comprises four individual longitudinally or axially spaced, impeller assemblies indicated generally at 62, 64, 66 and 68, each of the impeller assemblies being identical to the others and constituting the means for driving the output shaft 16 at a relatively high velocity. All of the impeller assemblies comprise like parts bearing like numerals. Using impeller assembly 62 as an example, a sun gear 70 is fixedly mounted to the shaft 16 by being pinned or the like as at 72, such that the sun gear in rotation drives the shaft 16. The sun gear is provided with gear teeth 74 at its periphery which are in mesh with the gear teeth of a plurality of planet gears indicated at 76, each planet gear being mounted for rotation about its axis by means of a shaft 78, one end of which projects through an opening 80 within an annular plate 82 which is apertured at 83 to rotate about shaft 16, which passes therethrough. The annular plate 82 is also mounted for rotation with respect to the inner casing 32 by ball bearing 84, the casing 12 forming an outer race for these ball bearings. Plate 82 also carries a plurality of elongated arcuate slots 86 adjacent to its periphery 88 of that member which functions as an inner race for ball bearings. Mounted to the side of the plate 82 opposite that of the planet gears 76 is a flywheel ring 90 whose outer diameter is less than that of the inner casing 12 and which provides an inertia mass to each impeller assembly. A ring gear 94 for each assembly has internal gear teeth 95 which are in mesh with the planetary gears 76 and is fixed to the inner casing 12 by way of a plurality of radial rods 97 such that the ring gear remains fixed while the other elements of the impeller assembly rotate. In this respect, the impeller indicated generally at 96 comprises an annular plate 98 being apertured as at 100 so as to bear on a reduced diameter portion 102 of the sun gear which constitutes an axial projection of that member and which rotates therein. The annular plate 98 rides on a shoulder 104 of the sun gear 70. The annular plate 98 is provided with a series of apertures as at 106 which are circumferentially spaced and in alignment and of a diameter equal to openings or apertures 80 within plate 82 so as to rotatably support the other end of shaft 78 for mounting the individual planet gears 76. Projecting axially from end face 108 of the annular plate 98 of impeller 96 are a plurality of arcuate blades 110 which extend from the outer periphery of the plate 98 to aperture 100, while intermediate of these blades are provided, respectively, shorter length blades 112. The blades 110 and 112 are curved and designed for high efficiency relative to the air stream which tangentially ejects from the oblique or inclined discharge ends 114 of the tubular inductor nozzles 24, FIG. 3.

In that respect, each of the tubular nozzles, there being four in number, corresponding to the four impeller assemblies 62, 64, 66 and 68, are circumferentially positioned with respect to each other at a distance of 90° and are also longitudinally or axially shifted so as to impart bearing loads on bearing assemblies 38 and 40 which balance each other out to prevent deflection of the shaft intermediate of its bearings. Additional bearings could be employed within end walls 48 and 50 of the inner casing 12. However, these are not needed due to the utilization of the ball bearings as at 84 between the periphery of the plates 82 and the fixed inner housing or casing 12.

A plurality of high pressure manifolds 22 extend longitudinally along the exterior of the outer casing 14 and comprise conduits whose ends 118 project through the wall of casing 14 and open to the interior of the high pressure air storage chamber 54. Each of the tubular injector nozzles 24 constituting straight line tubes 120 which preferably project through the inner casing 12 and the outer casing 14 at their ends open tangentially to the outer periphery of the blades 110 and 112. Their radially outer ends are capped as at 122 and threadably support a nozzle adjustment shaft 124 which terminates at its outer end in a hand wheel 126, this permitting the shaft to be rotated and shifted axially relative to tube 120. The tube 120 intersects a high pressure manifold 22 such that each high pressure manifold actually supports the outboard end of one tube 120 to form a pair of right angle high pressure air inlet openings 128 to the interior of the tubular tube 120. Further, the low pressure manifolds 20 comprise a plurality of tubes 130 which extend from the ring tube 60, and are open thereto to form a radial tube portion which extends radially beyond the outside of the outer casing 14. The lower pressure manifolds extend along the major length of casing 14, parallel to the high pressure manifold tubes 22. The ends of tubes 20 are sealed off as at 132, and small diameter connector tubes 134 couple the low pressure manifold tubes 20 to tubes 120 of the tubular inductor nozzles, radially inboard of the connection between the high pressure manifolds 18 and tubes 120, thereby forming inductor or aspirator openings 136 within the sides of tubes 120. The tubular inductor nozzles 24 further include short length sleeve members 138 whose outer diameter conforms to the inner diameter of tubes 120 and being sealably and slidably mounted therein. The sleeves 138 are provided with a converging axial bore or passage 140 in the direction of the oblique ends 114 and are fixed to shaft 134 by means of an open cage defined by circumferentially spaced bars 142 which are fixed at one end to sleeve 138 and at the opposite end to a disc 144 which in turn is fixed at its center to the threaded shaft 124. Sleeve 138, bars 142, disc 144 and shaft 124 may be unitary. The sleeve 138 is positioned between the inductor opening 136 and the openings 128 leading to the high pressure manifold 22. By rotating wheel 126, the position of the sleeve may be varied so as to selectively close off to a greater or lesser extent the openings 128 leading from the high pressure manifold 22 and thereby varying the rate of flow of air (CFM) from the high pressure air storage chamber 54 through the high pressure manifold 22 and through the converging nozzle passage 24 of sleeve member 138.

The spiral air motor includes a number of control devices. For instance, a conventional pressure sensor is shown at 150 being mounted within end wall 50 of the inner casing 12 so as to sense the pressure within the low pressure air accumulator chamber 52 and to indicate the same by way of indicator 152 connected thereto by way of a small diameter tube 154 and to further control the position of a butterfly valve 156 within the low pressure manifold tube 130 in each instance. Further, a butterfly valve 158 is positioned within each bypass conduit 160 which connects chamber 54 to each low pressure manifold tube 130, the butterfly valve 158 being controlled by a motor 152 which may comprise a solenoid or the like for selectively shutting off the fluid connection between the low pressure manifold tubes 130 and the high pressure air storage chamber 54. Further, pressure relief valves are provided for both chambers 52 and 54. A pressure relief valve 164 is provided for the high pressure air storage chamber 54 which opens directly into the side of the outer casing 14. A conduit 165 projects through chamber 54 and opens to the low pressure air accumulator chamber 52 within inner casing 12 and terminates exterior of the outer casing 14 at a pressure relief valve 168. The pressure relief set point of valves 164 and 168 is selected depending upon the pressure capacity of casing 12, 14 and the components associated therewith which are subjected to air pressures of respective chambers. Further, the outer casing 14 is provided with an air inlet pipe 170 which carries a valve 172 permitting the inlet pipe to be shut off after air pressurization of the high pressure air storage chamber 54 by a compressor (not shown) which may be selectively coupled to the pipe or tube 170.

In operation, the spiral air motor of the present invention particularly functions to recirculate the air after expansion within the tubular inductor nozzle at high velocity to a lower pressure and upon recovery of that air after impact against the impeller blading by way of the air induction or aspiration principles which recirculates the air at reduced pressure within its manifold system to the air induction openings downstream of the expansion point of the high pressure air emanating from the high pressure air storage chamber 54 through the high pressure manifolds leading to respective tubular induction nozzles.

Figure 4:
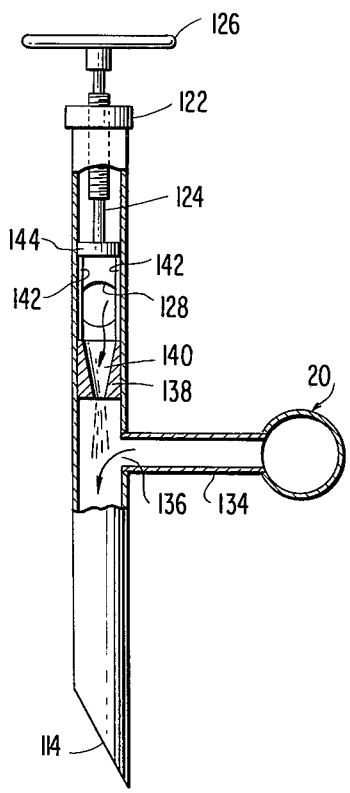
FIG. 4 is an elevational view, partially broken away, of one of the tubular inductor nozzles employed in the air motor of FIGS. 1-3.

In the illustrated embodiment, the impeller plates 108 are essentially approximately 3 ½ feet in diameter. Prior to the opening of the valve by moving the sleeves 138 within tubes 120 axially from the point where they cover the high pressure inlet openings 128 to the tube interior, compressed air is fed from a source (not shown) to the high pressure air storage chamber 54 by way of inlet pipe 170 and valve 172 to the extent of creating a mass of air therein at relatively high pressure, for instance, 1500 psi (although the pressure could be two or three times this amount depending upon the capability of the casings and other components of the motor to withstand this pressure). After filling chamber 54 with air at this pressure, the wheels 126 for all four tubular inductor nozzles are adjusted such that the sleeves 138 shift axially away from openings 128 and towards the low pressure inductor openings 136, for instance to the position shown in FIG. 4 from a position where the sleeve 138 overlies the openings 128. The air at a pressure of 1500 psi enters tube 120 upstream of the converging passage 140 within sleeve 138 and discharges at high velocity across the face of the inductor passage 136, this air ejecting from the oblique open ends 114 of the tubular inductor nozzle 24 impinging against the curved blades 110 and 112 of the associated impeller 94 and driving the same. Each of the impeller assemblies 62, 64, 66 and 68 now receive high velocity air impingement against the blading to cause annular plates 108 and 82 to rotate at relatively high velocity with respect to the fixed ring gear 92. The planetary gears 76 transmit this motion to the sun gear at 70 causing the sun gears to rotate at a much higher velocity, each sun gear 70 being fixed directly to the shaft and causing the output shaft 16 to rotate at some multiple of the velocity of the impeller 96. The force of rotation is additive with respect to the four impeller assemblies 62, 64, 66 and 68, thereby providing a high output torque for torque converter 42 and for transmission by way of shaft 46 to the speed transmission device mechanism 44 leading to an end use device (not shown).

The gear ratio provided by the planetary gear train for each of the impeller assemblies is, for example, 20 to 1, therefore the shaft 16 rotates at a speed approximately 20 times that of the impellers 94. The air pressure at the discharge opening 139 of the sleeve 138 is approximately 75 psi at 5.03 CFM, assuming that the diameter of that opening is ⅛ inch and that the high pressure air storage chamber pressure of 1500 psi has been transmitted to the converging passage 140 without loss of pressure. Of course, this is only theoretical and friction losses do exist throughout the machine. Further, of course, the machine will operate only for a given period of time until the air pressure within the storage chamber has been reduced, this taking a number of minutes or hours depending upon a number of parameters relative to the elements described above with respect to the spiral air motor.

Based on the examples given, the velocity of the air ejected at port or opening of sleeve 138 is sufficient to cause air at a lower pressure within the low pressure manifolds 20 to be inducted, that is, picked up and driven by the primary air passing through sleeve 138 for common discharge at the oblique or inclined opening 114 of tube 120, against the blades 110 and 112 of impellers 94. The velocity of the air decreases rapidly after impact with impellers 110 and 112 while the pressure increases, and while the air within the low pressure air accumulator chamber 52 also decreases with time, initially air will build up within that chamber to approximately 700 psi. After a period of time, as the air expands and is discharged from the high pressure air storage chamber 54, its pressure will be reduced to the extent that butterfly valve 158 may be opened as shown, FIG. 1, permitting fluid communication between chamber 54 and the low pressure manifold tubes 130.

The invention has been shown in terms of an air motor which is mounted for pivoting about a vertical axis, that is, the rotation of turntable 30 relative to base plate 26 on the ball bearings 28. This permits the machine to be positioned so that its output shaft is oriented with respect to an end use machine (not shown) to be driven thereby. Further, particularly where the air motor is mounted on a body which in turn moves relative to the air, it is possible that the end wall 34 of the outer chamber 14 may have openings leading to the exterior and which as a result of relative velocity between the body housing and the motor and the atmosphere, there may automatically be a pressure build up within the high pressure air storage chamber. Further, it is envisioned that the motor may be positioned in the path of a moving air stream which moves at relatively high velocity and which could be oriented such that openings within an end wall as at 34 would permit that air to enter chamber 54 for pressurization of the same.

While the elements making up the air motor have been shown as being formed of metal and light weight metals such as aluminum may be employed, it is possible that certain moving elements such as the planetary gear train may be formed of plastic which may incorporate self lubricating materials. Alternatively, since compressed air is required for pressurization of chamber 54, oil or other lubricant could be entrained within the air so that air in passage through the machine, that is, by way of the high and low pressure manifolds, may actually carry sufficient lubricant for lubricating the parts of the various impeller assemblies.

While the invention has been particularly shown and described with reference to a preferred embodiment thereof, it will be understood by those skilled in the art that various changes in form and details may be made therein without departing from the spirit and scope of the invention.

What is claimed is:
1. A high velocity spiral air motor comprising:
concentric, inner and outer closed cylindrical casings defining therebetween a first, high pressure air storage chamber, said inner closed cylindrical casing defining a second, low pressure air accumulator chamber,
a shaft extending coaxially through at least said inner cylindrical casing and mounted for rotation with respect thereto,
a plurality of impellers positioned within said inner casing and means for operatively connecting said impellers to said shaft at axially spaced positions,
a plurality of tubular induction nozzles fixedly mounted to said motor and projecting through said inner cylindrical casing and having open discharge ends, respectively, facing the periphery of said impellers and being spaced therefrom,
a high pressure manifold leading from said first chamber to said tubular induction nozzles upstream of the discharge ends thereof and opening to said tubular induction nozzles remote therefrom,
a low pressure manifold leading from one end of said second chamber and opening to said tubular nozzles at a point intermediate of said openings from the high pressure manifold and the discharge ends of said nozzles,
means defining a converging nozzle passage within said tubular inductor nozzles intermediate of the openings within said tubular induction nozzles from said low pressure and high pressure manifolds, and
means for charging said first chamber with air at relatively high pressure;
whereby, high pressure air from said first chamber in discharging through said nozzle passages within said tubular inductor nozzles, aspirates the low pressure air to recirculate spent air from said second chamber through said low pressure manifold openings of said tubular inductor nozzles to effect extended operation and improved efficiency of said spiral air motor.

2. The high velocity spiral air motor as claimed in claim 1, wherein said tubular inductor nozzles comprises thin wall tubes projecting through the sides of both cylindrical casings, and wherein the discharge ends of said tubes are oblique to the tube axis and lie tangent to the periphery of the impeller, and wherein the means defining a converging nozzle passage within said tubular inductor nozzles comprise sleeve members having an outer diameter on the order of the inner diameter of the nozzle tubes and are slidably positioned within said tubes for movement between a first position where they overlie the openings between the high pressure manifold and the tubes and a position where they lie intermediate of the low pressure and high pressure manifold openings for controlling the initiation of air flow from said high pressure air storage chamber and for controlling the rate of flow through said sleeves.

3. The high velocity spiral air motor as claimed in claim 1, wherein the radially outer ends of each inductor nozzle tube carries an end cap which closes off that end of each tube, a shaft threadably mounted to said end cap coaxially with said tube and an open cage fixing said sleeve member to said threaded shaft such that rotation of said shaft causes axial shifting of said sleeve relative to the high pressure manifold opening within said tube.

4. The high velocity spiral air motor as claimed in claim 3, wherein said means for operatively connecting said impellers to said shaft at axially spaced positions comprises a planetary gear train to effect a relatively large velocity increase between the speed of said impellers and that of said output shaft.

5. The high velocity spiral air motor as claimed in claim 4, wherein said planetary gear train comprises a sun gear at each impeller position fixed to said shaft and rotating therewith, annular plates positioned on respective sides of said sun gear and rotatable about said shaft and within said inner casing, a plurality of planet gears in mesh with the sun gear mounted for rotation about their axes between said annular plates and for movement with said annular plates, and a ring gear concentrically surrounds said planet gears and said sun gear and in mesh with said planet gears and being fixed to said inner casing and said impellers comprising impeller blades mounted on the face of one of said annular plates such that the air at high velocity discharging from the discharge ends of said nozzle tubes against the blades of said impeller cause rotation of said annular plates at a given velocity and rotation of said sun gears and said output shaft at a proportionately greater velocity.

6. The high velocity spiral air motor as claimed in claim 5, wherein an annular flywheel is mounted to a face of the annular plate not carrying the impeller blades.

7. The high velocity spiral air motor as claimed in claim 6, wherein at least one of the plates at each impeller location is of a diameter closely approximating the inner diameter of said inner casing, with the periphery of that plate and the inner wall of the inner casing defining ball bearing races, and a plurality of ball bearings positioned between the periphery of said at least one annular plate and said inner casing for absorbing the forces acting on said shaft and said impellers in response to operation of the air motor.

8. The high velocity spiral air motor as claimed in claim 7, further comprising a valve fluid connection between the low pressure manifold and the high pressure air storage chamber for selective communication therebetween upon reduction of air pressure within the high pressure air storage chamber subsequent to operation of the spiral air motor for a given period of time.

* * * * *